Aug. 13, 1929.  C. E. KRUEGER  1,724,287
BATTERY WATER LEVEL INDICATOR
Filed Aug. 5, 1927   2 Sheets-Sheet 1

WITNESS:
R. A. Thomas

C. E. Krueger  INVENTOR
BY Victor J. Evans  ATTORNEY

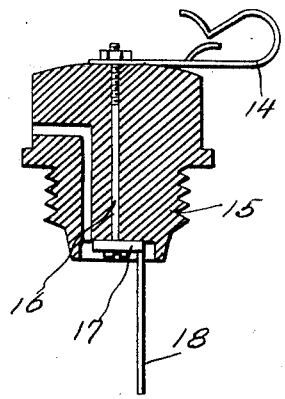
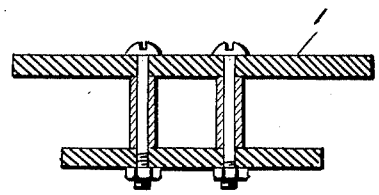
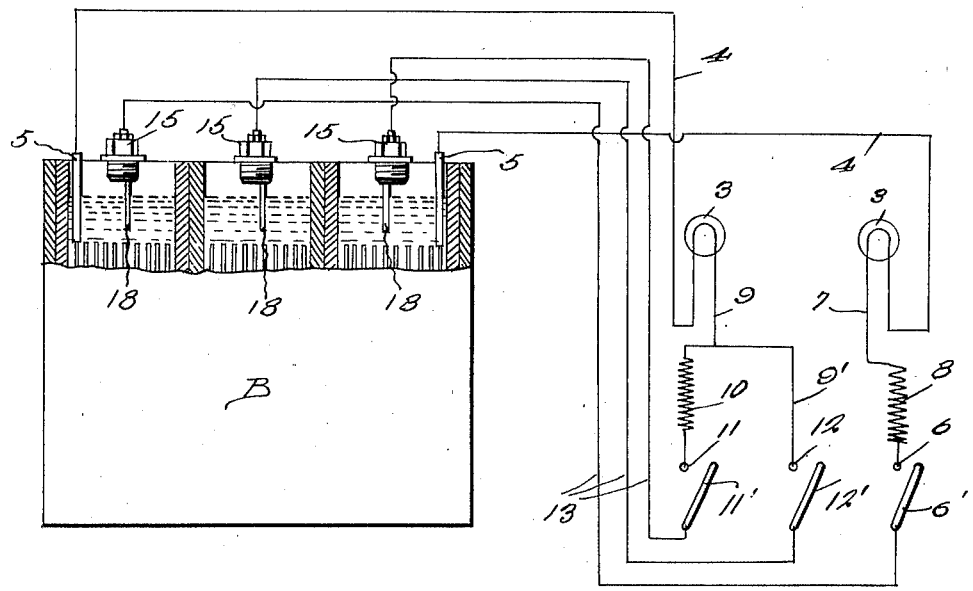

Patented Aug. 13, 1929.

1,724,287

UNITED STATES PATENT OFFICE.

CHARLES E. KRUEGER, OF ST. PAUL, MINNESOTA.

BATTERY-WATER-LEVEL INDICATOR.

Application filed August 5, 1927. Serial No. 210,931.

This invention relates to an indicator, the general object of the invention being to provide means for indicating when the cells of a battery need refilling.

Another object of the invention is to provide circuits including lamps and push buttons which will be closed when the push buttons are actuated to light the lamps as long as the water level in each cell is high, but when the water level is low, the circuits will be broken so that the operator will know, when he depresses a button and the lamp fails to light, that the battery needs refilling.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 4 is a section on line 4—4 of Figure 2.

Figure 5 is a sectional view through one of the closing plugs.

Figure 6 is a diagrammatic view of the circuits.

Figure 1:
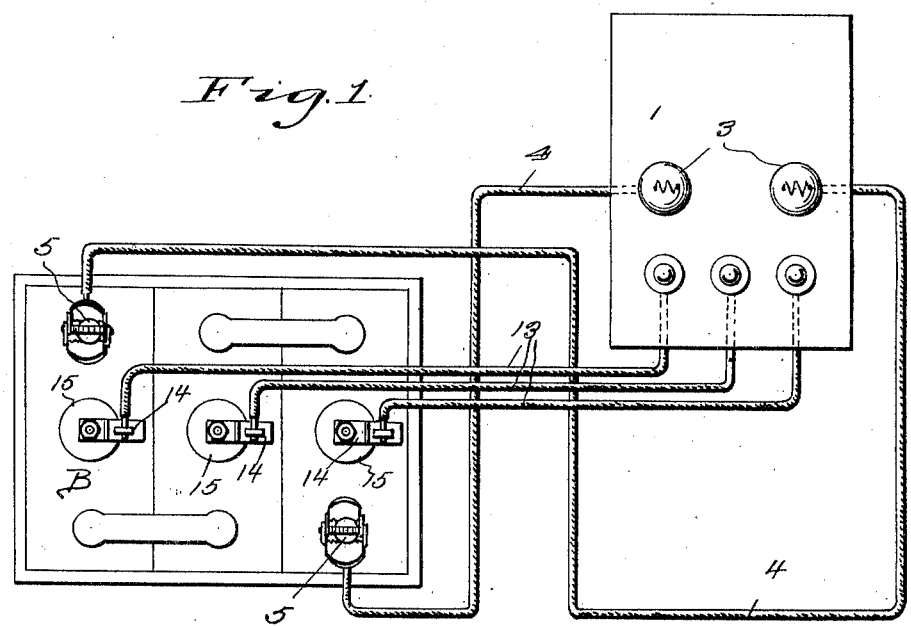
Figure 1 is a diagrammatic view of the invention.
Figure 2:
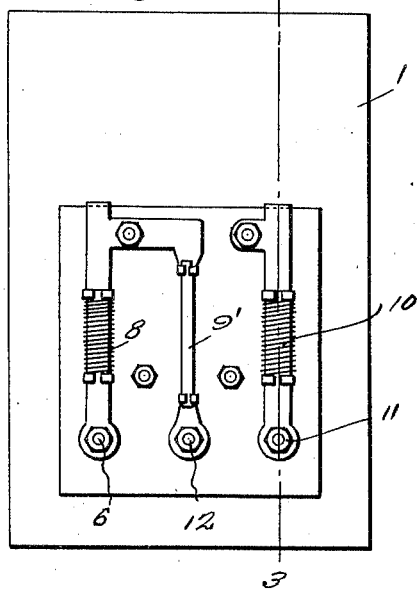
Figure 2 is a rear view of the switchboard.
Figure 3:
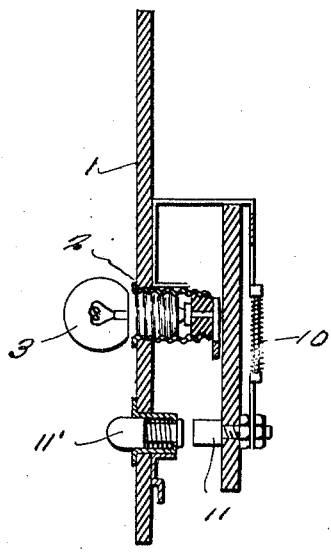
Figure 3 is a section on line 3—3 of Figure 2.

In these drawings, 1 indicates a switchboard which carries the pair of lamp sockets 2 for the lamps 3, the lamp sockets being connected by the conductors 4 with the positive and negative posts 5 of the battery B. One lamp socket is connected to a switch terminal 6 by the conductor 7 which includes the resistance 8 and the other lamp is connected by the conductor 9 which includes the resistance 10, to a switch terminal 11 and a branch conductor 9' connects the conductor 9 with a switch terminal 12. The switch buttons 6', 12' and 11' are connected by the conductors 13 with the clips 14, each of which is fastened to a plug 15 of the battery by a bolt 16 which passes through the plug and the clip and through a disk 17 at the lower end of the plug, which is provided with a depending rod 18 which projects into the liquid in the battery.

Thus by closing one of the switches, current will flow through the lamp which is connected with said switch as long as the rod 18, to which the switch is electrically connected, is immersed in the liquid, but if the liquid level reaches a point below the rod, then the circuit will be broken and the lamp will not light when the switch is closed, so that the operator will know that the cell needs refilling. As will be seen, each cell can be tested with this invention by closing the three switches, one after the other.

With this invention, an operator can test his battery without leaving the seat of the vehicle, if the battery is used on an automobile and thus the danger of the battery being neglected through failure to keep the same supplied with water is minimized.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

In combination with a battery, and a switchboard, a pair of lamps on the board, means for electrically connecting the lamps with the posts of the battery, three switch terminals on the board, means for connecting two of said terminals with one of the lamps, a resistance in the connection between one of said terminals and the lamp, means for connecting the third terminal with the second lamp, such means including a resistance, switch arms on the board for engaging and disengaging the terminals, a bolt passing through each plug of the battery, a clip on the outer end of the bolt, conductors connecting the clips with the switches, and a depending part on each bolt extending into the water in the battery.

In testimony whereof I affix my signature.

CHARLES E. KRUEGER.